(12) United States Patent
Schaefer et al.

(10) Patent No.: US 12,730,732 B2
(45) Date of Patent: Sep. 8, 2026

(54) MEMORY DEVICE HEALTH MONITORING LOGIC

(71) Applicant: Micron Technology, Inc., Boise, ID (US)

(72) Inventors: Scott E. Schaefer, Boise, ID (US); Aaron P. Boehm, Boise, ID (US); Todd Jackson Plum, Boise, ID (US); Mark D. Ingram, Boise, ID (US); Scott D. Van De Graaff, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 63 days.

(21) Appl. No.: 18/630,614

(22) Filed: Apr. 9, 2024

(65) Prior Publication Data

US 2024/0345932 A1 Oct. 17, 2024

Related U.S. Application Data

(60) Provisional application No. 63/496,578, filed on Apr. 17, 2023.

(51) Int. Cl.
*G06F 11/00* (2006.01)
*G06F 11/30* (2006.01)

(52) U.S. Cl.
CPC ...... *G06F 11/3034* (2013.01); *G06F 11/3062* (2013.01); *G06F 11/3075* (2013.01)

(58) Field of Classification Search
None
See application file for complete search history.

(56) References Cited

U.S. PATENT DOCUMENTS 9,983,828 B2 * 5/2018 Shen .................... G11C 29/42
2007/0198786 A1 8/2007 Bychkov et al.
2012/0117304 A1 5/2012 Worthington et al.
2021/0124639 A1 4/2021 Zhang et al.
2021/0182141 A1 6/2021 Balb et al.

(Continued)

OTHER PUBLICATIONS

Google Scholar/Patents search—text refined (Year: 2025).*

(Continued)

*Primary Examiner* — Christopher S Mccarthy
(74) *Attorney, Agent, or Firm* — Holland & Hart LLP

(57) ABSTRACT

Methods, systems, and devices for memory device health monitoring logic are described. In accordance with examples as disclosed herein, a memory device may include health monitoring logic configured to monitor a degradation level of the memory device. Further, the health monitoring logic may include a self-check logic to monitor the degradation level of the health monitoring logic. Using the health monitoring logic, the memory device may evaluate and store a health state of the memory device, which may be used to flag a fault in the memory device, among other responsive operations. Additionally, using the self-check logic, the memory device may evaluate and store a health state of the health monitoring logic, which may be used to flag a fault of the previously evaluated health state of the memory device. Based on the self-check flag, a host device may halt or adjust the response operations associated with the memory device.

19 Claims, 7 Drawing Sheets

(56) References Cited

U.S. PATENT DOCUMENTS

| | | | | |
|---|---|---|---|---|
| 2022/0012148 | A1* | 1/2022 | Plum | G06F 11/3075 |
| 2022/0035535 | A1* | 2/2022 | Van De Graaff | G11C 11/4076 |

OTHER PUBLICATIONS

Google Scholar/Patents search (Year: 2025).*
Google Scholar/Patents search—text refined (Year: 2026).*
“International Search Report and Written Opinion of the International Searching Authority,” issued in connection with Int’l Appl. No. PCT/US2024/023993, dated Jul. 26, 2024 (10 pages).

* cited by examiner

500

600

700

MEMORY DEVICE HEALTH MONITORING LOGIC

CROSS REFERENCE

The present application for patent claims the benefit of U.S. Provisional Patent Application No. 63/496,578 by SCHAEFER et al., entitled "MEMORY DEVICE HEALTH MONITORING LOGIC," filed Apr. 17, 2023, assigned to the assignee hereof, and expressly incorporated by reference in its entirety herein.

TECHNICAL FIELD

The following relates to one or more systems for memory, including memory device health monitoring logic.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

Figure 1:
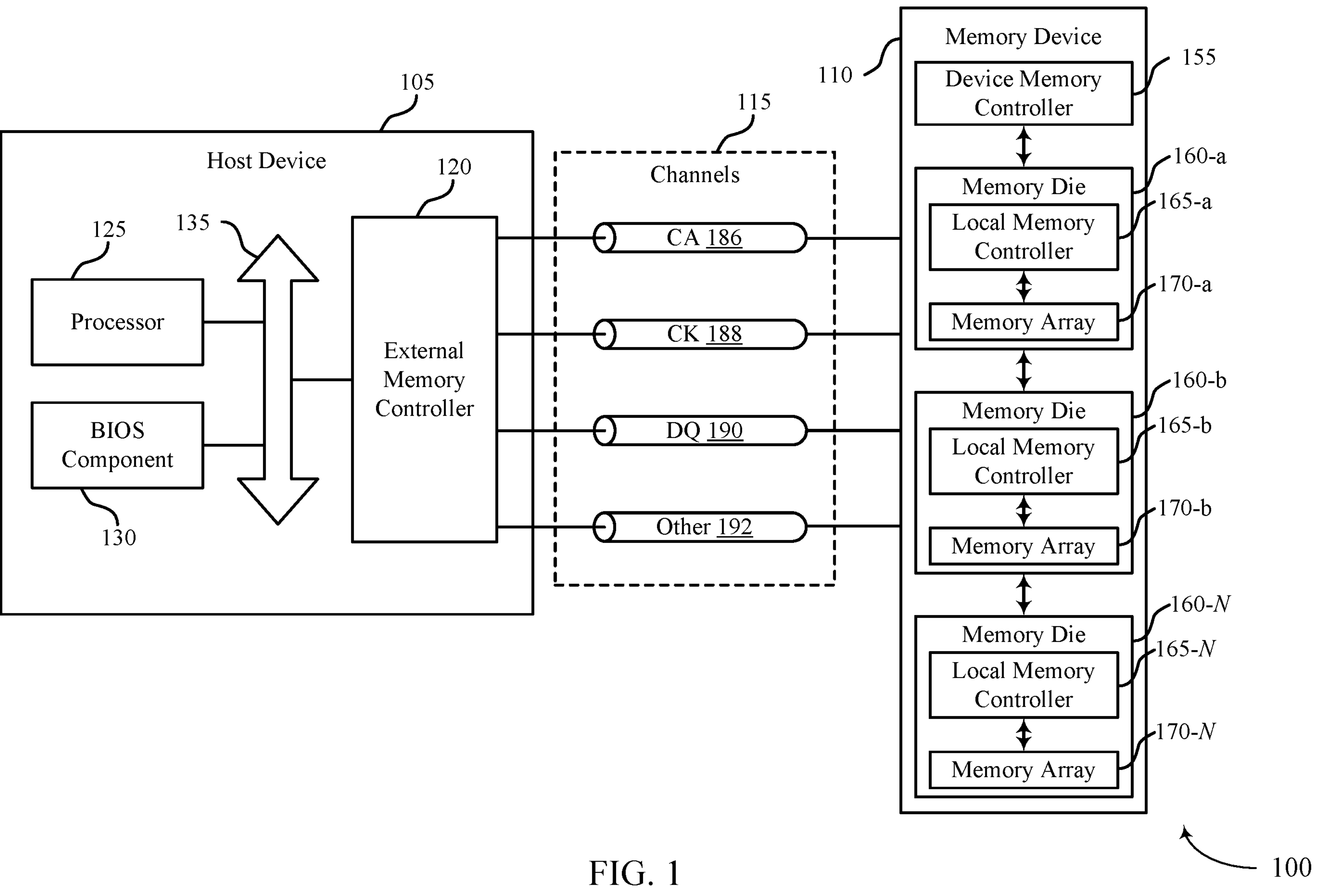
FIG. 1 shows an example of a system that supports memory device health monitoring logic in accordance with examples as disclosed herein.

Memory devices may include components (e.g., circuitry, semiconductor die structures, transistors, memory cells) that change over time, over an accumulation of access operations, or over an accumulation of stress (e.g., electrical stress, thermal stress, mechanical stress), among other conditions. In some cases, these conditions may degrade performance of the memory device (e.g., degrade a capability for writing, maintaining, or reading information). Some memory devices may include logic, such as health monitoring logic (e.g., degradation monitoring logic, wear monitoring logic), configured to monitor for degradation (e.g., wear or other parameters) and to notify another device (e.g., a host device) of a status of the memory device or one or more components thereof. However, in some examples, the health monitoring logic may also experience degradation over an accumulation of use or stress over time, resulting in faulty health monitoring. In some such examples, degraded health monitoring logic may falsely determine that the memory device has faulted, leading to an unnecessary halt in performance or unnecessary corrections. Alternatively, degraded health monitoring logic may falsely determine that the memory device has not faulted, leading to a prolonged usage of the faulty memory device. Therefore, monitoring (e.g., validating) the health of the health monitoring logic may be desirable.

In accordance with examples as disclosed herein, a memory device may include health monitoring logic configured to monitor a degradation level of the memory device. Further, the health monitoring logic may include a self-check logic to monitor the degradation level of the health monitoring logic. Using the health monitoring logic, the memory device may evaluate and store a health state of the memory device, which may be used to flag a fault (e.g., for replacement of the memory device, for operation of the memory device in a safe mode) or to reject the memory device, among other responsive operations. Additionally, using the self-check logic, the memory device may evaluate and store a health state of the health monitoring logic, which may be used to flag a fault or reject the previously evaluated health state of the memory device. In accordance with these and other examples, techniques for the evaluation of memory device health monitoring may mitigate failure modes or operational uncertainties of a memory device that may be associated with faults of the health monitoring logic itself. Additionally, time costs may be reduced by monitoring the health of the health monitoring logic during operation of the health monitoring logic (e.g., in real time), among other benefits.

In addition to applicability in memory systems as described herein, techniques for improved efficiency related to memory device health monitoring may be generally implemented to improve the performance of various electronic devices and systems (including artificial intelligence (AI) applications, augmented reality (AR) applications, virtual reality (VR) applications, and gaming). Some electronic device applications, including high-performance applications such as AI, AR, VR, and gaming, may be associated with relatively high processing requirements to satisfy user expectations. As such, increasing processing capabilities of the electronic devices by decreasing response times, improving power consumption, reducing complexity, increasing data throughput or access speeds, decreasing communication times, or increasing memory capacity or density, among other performance indicators, may improve user experience or appeal. Implementing the techniques described herein may improve the performance of electronic devices by facilitating improved memory device health monitoring, which may decrease processing or latency times, improve response times, or otherwise improve user experience, among other benefits.

Features of the disclosure are initially described in the context of systems and dies as described with reference to FIG. 1. Features of the disclosure are described in the context of logic diagrams and process flows as described with reference to FIGS. 2 and 3. These and other features of the disclosure are further illustrated by and described with reference to apparatus diagrams and flowcharts that relate to memory device health monitoring logic as described with reference to FIGS. 4 through 7.

FIG. 1 shows an example of a system 100 that supports memory device health monitoring logic in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system 100 that is operable to store data for one or more other components of the system 100.

Portions of the system 100 may be examples of the host device 105. The host device 105 may be an example of a processor (e.g., circuitry, processing circuitry, a processing component) within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or any combination thereof that implements the functions of one or more external memory controllers 120. In some examples, the one or more external memory controllers 120 may be referred to as a host (e.g., host device 105).

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other functions.

The memory device 110 may be operable to store data for the components of the host device 105. In some examples, the memory device 110 (e.g., operating as a secondary-type device to the host device 105, operating as a dependent-type device to the host device 105) may respond to and execute commands provided by the host device 105 through the one or more external memory controllers 120. Such commands may include one or more of a write command for a write operation, a read command for a read operation, a refresh command for a refresh operation, or other commands.

The host device 105 may include one or more of one or more external memory controllers 120, one or more processor 125, a basic input/output system (BIOS) component 130, or other components such as one or more peripheral components or one or more input/output controllers. The components of the host device 105 may be coupled with one another using a bus 135.

The one or more processors 125 may be operable to provide functionality (e.g., control functionality) for the system 100 or the host device 105. The one or more processors 125 may be a general-purpose processor, a digital signal processor (DSP), an application-specific integrated circuit (ASIC), a field-programmable gate array (FPGA) or other programmable logic device, discrete gate or transistor logic, discrete hardware components, or any combination of these components. In such examples, the one or more processors 125 may be an example of a central processing unit (CPU), a graphics processing unit (GPU), a general purpose GPU (GPGPU), or an SoC, among other examples. In some examples, the one or more external memory controllers 120 may be implemented by or be a part of the one or more processors 125.

The BIOS component 130 may be a software component that includes a BIOS operated as firmware, which may initialize and run various hardware components of the system 100 or the host device 105. The BIOS component 130 may also manage data flow between the one or more processor 125 and the various components of the system 100 or the host device 105. The BIOS component 130 may include instructions (e.g., a program, software) stored in one or more of read-only memory (ROM), flash memory, or other non-volatile memory.

In some examples, the system 100 or the host device 105 may include an input component, an output component, or both. An input component may represent a device or signal external to the system 100 that provides information (e.g., signals, data) to the system 100 or its components. In some examples, and input component may include an interface (e.g., a user interface or an interface between other devices). In some examples, an input component may be a peripheral that interfaces with system 100 via one or more peripheral components or may be managed by one or more I/O controllers. An output component may represent a device or signal external to the system 100 operable to receive an output from the system 100 or any of its components. Examples of an output component may include a display, audio speakers, a printing device, another processor on a printed circuit board, and others. In some examples, an output may be a peripheral that interfaces with the system 100 via one or more peripheral components or may be managed by one or more I/O controllers.

The memory device 110 may include one or more device memory controllers 155 and one or more memory dies 160 (e.g., memory chips) to support a capacity (e.g., a desired capacity, a specified capacity) for data storage. Each memory die 160 (e.g., memory die 160-*a*, memory die 160-*b*, memory die 160-N) may include one or more local memory controllers 165 (e.g., local memory controller(s) 165-*a*, local memory controller(s) 165-*b*, local memory controller(s) 165-N) and a memory array 170 (e.g., memory array 170-*a*, memory array 170-*b*, memory array 170-N). A memory array 170 may be a collection (e.g., one or more grids, one or more banks, one or more tiles, one or more sections) of memory cells, with each memory cell being operable to store one or more bits of data. A memory device 110 including two or more memory dies 160 may be referred to as a multi-die memory or a multi-die package or a multi-chip memory or a multi-chip package.

The one or more device memory controllers 155 may include components (e.g., circuitry, logic) operable to control operation of the memory device 110. The one or more device memory controllers 155 may include hardware, firmware, or instructions that enable the memory device 110 to perform various operations and may be operable to receive, transmit, or execute commands, data, or control information related to the components of the memory device 110. The one or more device memory controllers 155 may be operable to communicate with one or more of the external memory controllers 120, the one or more memory dies 160, or the one or more processors 125. In some examples, the one or more device memory controllers 155 may control operation of the memory device 110 described herein in conjunction with the one or more local memory controllers 165 of the memory die 160.

In some examples, the memory device 110 may communicate information (e.g., data, commands, or both) with the host device 105. For example, the memory device 110 may receive a write command indicating that the memory device 110 is to store data received from the host device 105, or receive a read command indicating that the memory device 110 is to provide data stored in a memory die 160 to the host device 105, among other types of information communication.

A local memory controller 165 (e.g., local to a memory die 160) may include components (e.g., circuitry, logic) operable to control operation of the memory die 160. In some examples, a local memory controller 165 may be operable to communicate (e.g., receive or transmit data or commands or both) with the one or more device memory controllers 155. In some examples, a memory device 110 may not include a device memory controller 155, and one or more local memory controllers 165 or one or more external memory controllers 120 may perform various functions described herein. As such, one or more local memory controllers 165 may be operable to communicate with one or more device memory controllers 155, with one or more other local memory controllers 165, or directly with one or more external memory controllers 120, or one or more processors 125, or any combination thereof. Examples of components that may be included in one or more device memory controller 155 or one or more local memory controllers 165 or both may include receivers for receiving signals (e.g., from one or more external memory controller 120), transmitters for transmitting signals (e.g., to one or more external memory controller 120), decoders for decoding or demodulating received signals, encoders for encoding or modulating signals to be transmitted, or various other components operable for supporting described operations of one or more device memory controller 155 or one or more local memory controllers 165 or both.

An external memory controller 120 may be operable to enable communication of information (e.g., data, commands, or both) between components of the system 100 (e.g., between components of the host device 105, such as the one or more processors 125, and the memory device 110). An external memory controller 120 may process (e.g., convert, translate) communications exchanged between the components of the host device 105 and the memory device 110. In some examples, one or more external memory controllers 120, or other component of the system 100 or the host device 105, or its functions described herein, may be implemented by the one or more processors 125. For example, the one or more external memory controllers 120 may be hardware, firmware, or software, or some combination thereof implemented by the one or more processors 125 or other component of the system 100 or the host device 105. Although the one or more external memory controllers 120 are depicted as being external to the memory device 110, in some examples, the one or more external memory controllers 120, or its functions described herein, may be implemented by one or more components of a memory device 110 (e.g., one or more device memory controllers 155, one or more local memory controllers 165) or vice versa.

The components of the host device 105 may exchange information with the memory device 110 using one or more channels 115. The channels 115 may be operable to support communications between the one or more external memory controllers 120 and the memory device 110. Each channel 115 may be an example of a transmission medium that carries information between the host device 105 and the memory device 110. Each channel 115 may include one or more signal paths (e.g., a transmission medium, a conductor) between terminals associated with the components of the system 100. A signal path may be an example of a conductive path operable to carry a signal. For example, a channel 115 may be associated with a first terminal (e.g., including one or more pins, including one or more pads) at the host device 105 and a second terminal at the memory device 110. A terminal may be an example of a conductive input or output point of a device of the system 100, and a terminal may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or any combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

The memory device 110 may include one or more registers (e.g., operation register (OP), no-operation register (NOP), or the like), such as one or more mode registers, among others. In some cases, the mode registers may be coupled with health monitoring logic (e.g., health monitoring circuitry) to monitor the health of the memory device 110 or components thereof. For example, the health monitoring logic may monitor one or more metrics of the memory device 110 to determine a health state of the memory device 110, and store an indication of the health state (e.g., 1 or 0) in one of the mode registers. Additionally, the health monitoring logic may include self-check logic to monitor the health of the health monitoring logic or components thereof. For example, the health monitoring logic may monitor one or more metrics of the health monitoring logic to determine a health state of the health monitoring logic, and store an indication of the health monitoring health state the mode register. Accordingly, the health monitoring health state may indicate whether the health state of the memory device is faulty (e.g., at-risk of being faulty) or valid. Based on the memory device health state, the health monitoring health state, or both, the host device 105 may perform or refrain from performing one or more operations at the memory device 110.

In addition to applicability in memory systems as described herein, techniques for memory device health monitoring logic may be generally implemented to improve the sustainability of various electronic devices and systems. As the use of electronic devices has become even more widespread, the quantity of energy used and harmful emissions associated with production of electronic devices and device operation has increased. Further, the amount of waste (e.g., electronic waste) associated with disposal of electronic devices may also pose environmental concerns. Implementing the techniques described herein may improve the impact related to electronic devices by reducing the turnover of functional electronic devices (e.g., false fault flags) and improving the reliability of health monitoring circuitry, which may extend the life of electronic devices and thereby reduce electronic waste, among other benefits.

Figure 2:
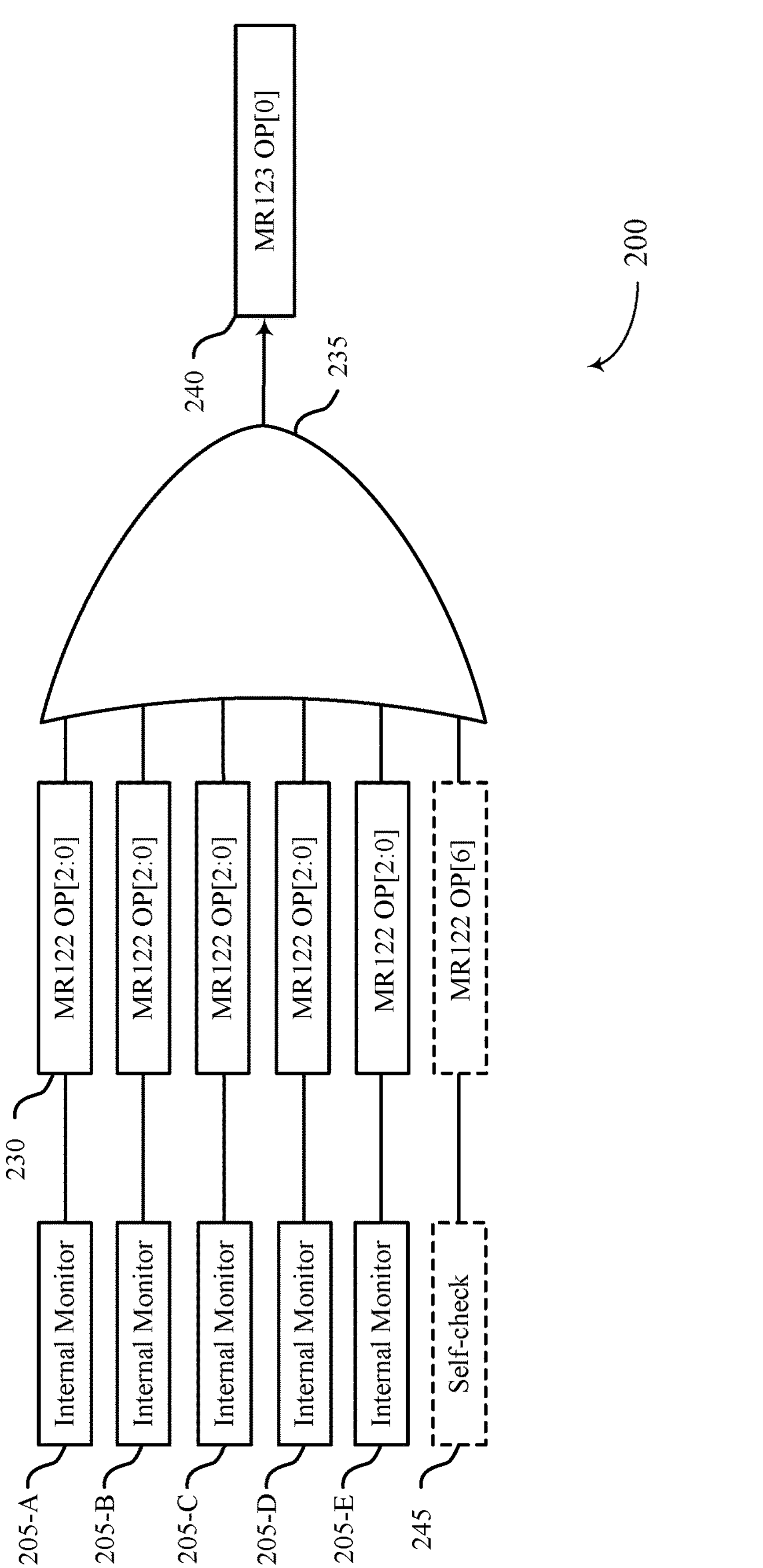
FIG. 2 shows an example of a logic diagram that supports memory device health monitoring logic in accordance with examples as disclosed herein.

FIG. 2 shows an example of a logic diagram 200 that supports memory device health monitoring logic in accordance with examples as disclosed herein. The logic diagram 200 may be implemented by a health monitoring circuitry (e.g., health monitoring logic) of a memory device 110 as described with reference to FIG. 1.

The memory device 110 may also include one or more registers, such as a mode register 230 (e.g., MR122) and a mode register 240 (e.g., MR123), among others (e.g., a configuration register, an adaptive flag register, a readout register). In some cases, one or more of the registers may be written to or read from by the memory device 110, or a device external to the memory device 110 (e.g., by a host device 105), or a combination thereof. For example, the mode register 230 and the mode register 240 may be coupled with pins, which may support the mode register 230 and the mode register 240 being accessed by (e.g., written to, read from) a host device 105. In some cases, the mode register 230 and the mode register 240 may be coupled with health monitoring circuitry (e.g., a logic gate 235), which may support the mode register 230 and the mode register 240 being accessed by the circuitry. In some examples, the mode register 230 and the mode register 240 may serve as access points for monitoring a status or information associated with a health of the memory device 110 and may be enabled or disabled on a device basis. For example, the mode register 230 may be coupled with one or more of internal monitors 205 (e.g., 205-*a* through 205-*e*) or the like.

The internal monitors 205 may monitor a degradation level of one or more components of a memory array 170 or of other portions of the memory device 110. For example, the internal monitors 205 may be configured to monitor one or more metrics associated with the memory device 110, such as a wear level of a component (e.g., a resistor, a capacitor, a transistor, a diode, an oscillator, a driver, a latch, a register) of the memory device 110, a temperature of a component of the memory device 110, or an operating frequency of a component of the memory device 110, among other metrics.

In some examples, the health monitoring circuitry of the memory device 110 may monitor one or more degradation levels in accordance with a configuration received via a register or in accordance with a default (e.g., predefined, as-built) configuration. For example, the memory device 110 may be configured with a set of one or more indexed degradation levels for the memory device 110, and a host device 105 may indicate a respective index to the memory device 110 via a register. Thus, a host device 105 may dynamically indicate a configuration of the health monitoring circuitry in accordance with a degradation level. For example, a first value of a mode register 230 (e.g., '000') may correspond to a first index indicating a 100 percent degradation level, a second value of the mode register 230 (e.g., '001') may correspond to a second index indicating a 90 percent degradation level, and so on. In some cases, a third value of the mode register 230 (e.g., '111') may be supplied regardless of (e.g., independent of) a degradation level of the memory device 110. For example, the health monitoring circuitry may be configured with a trip point that provides an indication (e.g., a flag, a fault indication) at a "time zero" or zero percent degradation.

The mode register 240 may be operable to send an indication to a host device 105 if a metric of the memory device 110 satisfies the indicated degradation level. For example, the memory device 110 may write a value to the mode register 240 (e.g., a bit of the mode register, e.g., OP[0]) to indicate whether the degradation level is satisfied. If the degradation level is satisfied (e.g., a fault is identified), the memory device 110 may set the bit high (e.g., to a value of '1'). Alternatively, if the degradation level is not satisfied (e.g., no fault is identified), the memory device 110 may set the bit low (e.g., to a value of '0'). A host device 105 may read the mode register 240 (e.g., transmit a mode register read (MRR) command to the memory device 110), which results may indicate to the host device 105 whether the indicated degradation level has been satisfied. In some cases, the host device 105 may poll (e.g., read from using MRR commands, monitor) the mode register 240 periodically (e.g., at set time intervals), or in response to an indication from the memory device 110, among other initiating conditions. The host device 105 may read bit value(s) from the mode register 240, using a read command (e.g., MRR command). For example, the host device 105 may transmit the read command to the memory device 110, and the memory device 110 may read out the value from the mode register 240 and send the value to the host device 105 in response to the read command.

In some cases, the health monitoring circuitry may also experience degradation and may not operate correctly. For example, over time, one or more components of the circuitry of the health monitoring circuitry may experience wear-out, relatively high temperatures, or the like, which may impact the accuracy of the health monitoring circuitry. In some examples, the health monitoring circuitry may write a false (e.g., invalid) value to the mode register 240 (e.g., a bit of the mode register, e.g., OP[0]). Specifically, the memory device 110 may set the bit high (e.g., to a value of '1'), falsely indicating that the degradation level is satisfied (e.g., a fault is identified) when there is no fault. Alternatively, the memory device 110 may set the bit low (e.g., to a value of '0'), falsely indicating that the degradation level is not satisfied (e.g., no fault is identified) when there is a fault. Accordingly, the host device 105 may obtain an invalid value by reading the value from the mode register 240.

To validate the obtained value from mode register 240, the host device 105 may obtain a second value from the mode register 240 indicating the health of the health monitoring circuitry. For example, the health monitoring circuitry may be configured to include a self-check circuit to monitor a self-check degradation level of the health monitoring circuitry. The memory device 110 may write a second value to the mode register 240 (e.g., another bit of the mode register, e.g., OP[6]) to indicate whether the self-check circuitry is operating correctly (e.g., the self-check degradation level is satisfied). If the self-check circuitry is not operating correctly (e.g., a fault is identified), the memory device 110 may set the bit high (e.g., to a value of '1'). Alternatively, if the self-check circuitry is operating correctly (e.g., no fault is identified), the memory device 110 may set the bit low (e.g., to a value of '0').

The host device 105 may read the mode register 240 (e.g., perform an MRR), to obtain the first value, the second value, or both. The second value may indicate to the host device 105 whether the first value is valid or not valid (e.g., at-risk for being invalid). For example, if the self-check value is low (e.g., OP[6]=0), the health value (e.g., OP[0]=0 or OP[0]=1) may be identified as valid, and therefore an accurate indication of the health state of memory device 110. However, if the self-check value is high (e.g., OP[6]=1), the health value (e.g., OP[0]=0 or OP[0]=1) may not be identified as valid, and therefore at-risk for being an inaccurate indication of the health state of memory device 110. In some cases, when the self-check value is high, the host device 105 may be configured to discard (e.g., ignore) the health value. Alternatively, when the self-check value is low, the host device 105 may be configured to perform additional operations on the memory device 110 according to the indicated health state of the memory device 110. Accordingly, the self-check logic of a health monitoring logic may mitigate failure modes or operational uncertainties of the memory device 110 associated with faults of the health monitoring logic itself. For example, the host device 105 may identify false fault flags and continue operation on functional memory device 110, or alternatively, may perform an additional check on the memory device health before operating on a faulty memory device 110.

In some examples, the memory device 110 may alternatively combine the self-check value with various other health monitoring circuitry. In such examples, values related to internal monitoring may be combined (e.g., XORed) with the self-check value. Additionally or alternatively, the self-check value may be stand-alone indicator as well. For example, if MR123[0] stores a value related to health monitoring and MR123[6] stores the self-check value, the memory device 110 may check MR123 [0] before checking MR123 [6]. In such an example, if MR123 [0] is low, then the memory device 110 may skip checking MR123 [6] because it is likely a low value as well. If, however, MR123 [0] is high, that may indicate that there is either a problem with the internal monitoring or the self-check circuitry identified something wrong with health check circuitry. If MR123 [0] is high and MR123 [6] is low, then the memory device 110 may determine that the health monitoring circuitry is working properly and it detected an error. If MR123 [0] is high and MR123 [6] is high, then the memory device 110 may determine that the health monitoring circuitry is faulty. The self-check value may be combined with any health monitoring value (or any combination of health monitoring values).

The memory device 110 may include an input from an additional bit of the mode register 230 (e.g., MR122 [6]), which may be coupled with health monitoring circuitry (e.g., a logic gate 235). For example, the health monitoring circuitry may be configured to receive an input from a self-check circuit 245 to monitor a self-check degradation level of the health monitoring circuitry. Accordingly, the self-check circuit 245 may write a second value to the mode register 230 (e.g., another bit of the mode register, e.g., MR 122 OP[6]) to indicate whether the health circuitry is operating correctly (e.g., the self-check degradation level is satisfied). If the health monitoring circuitry is not operating correctly (e.g., a fault is identified), the memory device 110 may set the bit high (e.g., to a value of '1'). Alternatively, if the health monitoring circuitry is operating correctly (e.g., no fault is identified), the memory device 110 may set the bit low (e.g., to a value of '0').

In some cases, the host device 105 may read and evaluate both bits of mode register 240 (e.g., MR123 OP[0] and MR123 OP[6]) for each MRR, as described herein. For example, the MRR may read and evaluate both bits concurrently, or in a sequence, irrespective of the value indicated by one or both bits. Alternatively, the host device 105 may read and evaluate a first bit of the mode register 240 (e.g., MR123 OP[0]) to evaluate whether any errors—either a memory device fault indicated by one or more of the internal monitors 205, a health monitoring circuit fault indicated by the self-check circuit 245, or both—have occurred. For example, if the first bit of the mode register 240 is low, the host device 105 may determine that no errors have occurred at the memory device 110. Additionally, the host device 105 may determine that no errors have occurred at the health monitoring circuit, thus validating the absence of errors of the memory device 110. Alternatively, if the first bit of the mode register 240 (e.g., MR123 OP[0]) is high, the host device 105 may then evaluate a second bit of the mode register 240 (e.g., MR123 OP[6]) to determine whether the health value (e.g., OP[0]=0 or OP[0]=1) may or may not be identified as valid. As described herein, if the second bit of the mode register 240 is high, the health value may be at-risk for being an inaccurate indication of the health state of memory device 110. Alternatively, if the second bit of the mode register 240 is low, the host device 105 may perform additional operations on the memory device 110 according to the indicated health state of the memory device 110.

Figure 3:
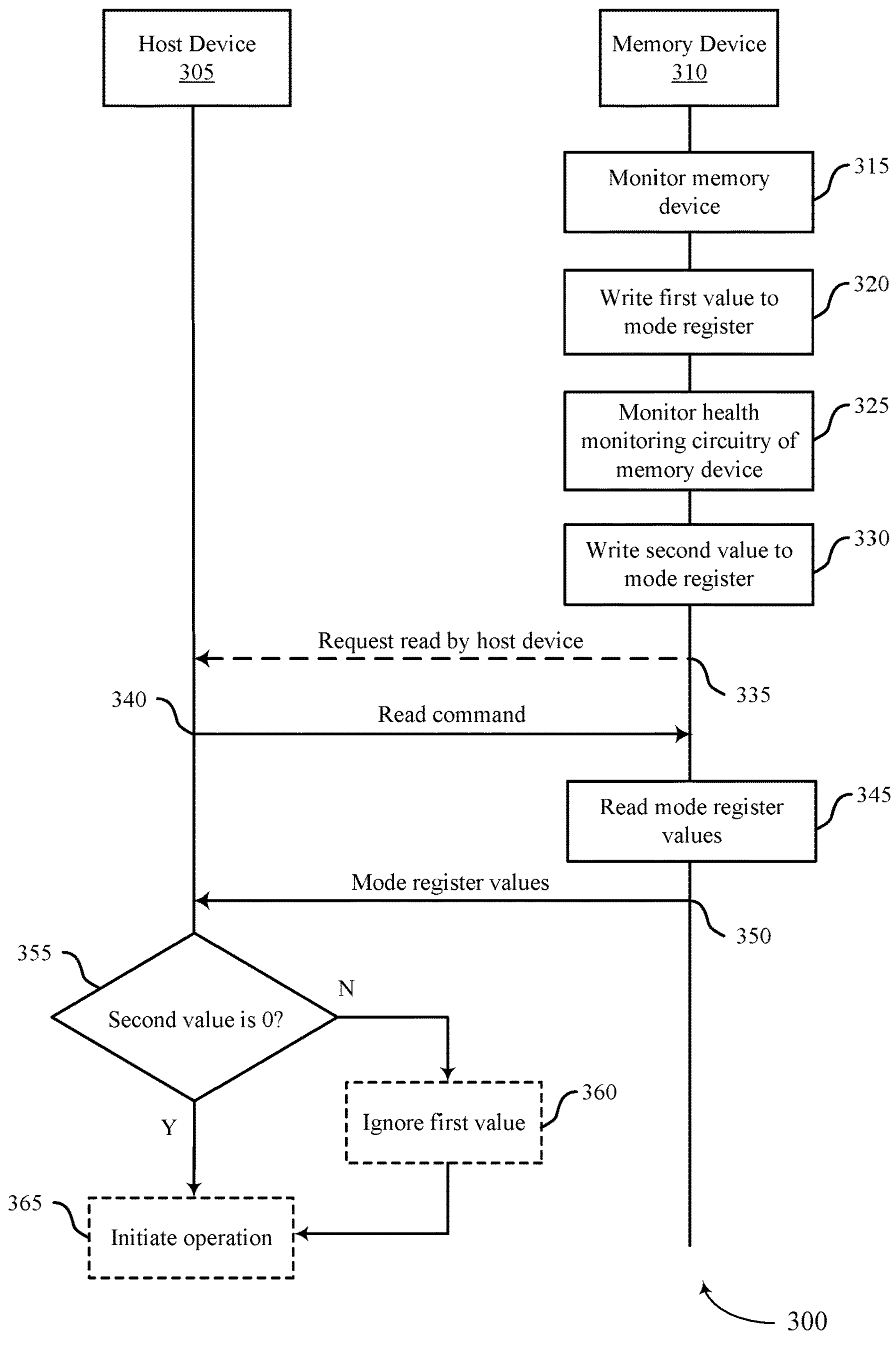
FIG. 3 shows an example of a process flow that supports memory device health monitoring logic in accordance with examples as disclosed herein.

FIG. 3 shows an example of a process flow 300 that supports memory device health monitoring logic in accordance with examples as disclosed herein. The process flow 300 may illustrate operations of a host device 305 and a memory device 310. In some examples, the host device 305 and the memory device 310 may represent aspects of a host device 105 and a memory device 110 as described with reference to FIG. 1. The process flow 300 may illustrate a process for evaluating the health of the memory device using health monitoring logic, as described with reference to FIG. 2, and evaluating the health of the health monitoring logic.

At 315, the memory device 310 may begin monitoring a health level of the memory device 310 (e.g., a memory array of the memory device). For example, the memory device 310 may enable health monitoring logic (e.g., circuitry) of the memory device 310 to perform a health check of the memory device 310. The health monitoring logic may receive inputs from one or more internal monitors, each internal monitor configured to monitor one or more metrics (e.g., parameters) of the memory device 310. For example, an internal monitor may monitor a wear level of a component of the memory device 110, a temperature of a component of the memory device 110, or an operating frequency of a component of the memory device 110, among other metrics. In some examples, the health check may indicate a binary condition where the health monitoring logic indicates whether the parameter being monitored is in a valid range or is outside a valid range. In some examples, the health check may be associated with a trip condition of the health monitoring logic for indicating a fault (e.g., to evaluate whether the health monitoring logic outputs a fault). In some examples, enabling the health monitoring logic may include enabling a one or more portions of the health monitoring logic (e.g., a portion associated with evaluating in accordance with a 0% degradation level, a portion associated with evaluating in accordance with a 10% degradation level, and the like). The memory device 310 may determine whether a degradation metric associated with one or more components of the memory device 310 satisfies the degradation level associated with the enabled portions of the health monitoring logic. Using, the health monitoring logic, the memory device 310 may generate a first value (e.g., 0 or 1).

At 320, the memory device 310 may write a first value to a mode register (MR123) of one or more mode registers. The memory device may use a mode register write (MRW) command to write the first value to the mode register. Any value written to a mode register (either by a host device or a memory device) may be written using a MRW or some other type of command. In some examples, if the one or more components of the memory device 310 satisfy the degradation level, the memory device 310 may set a first bit of the mode register high (e.g., OP[0]=1). Accordingly, the bit may indicate that a fault has occurred (e.g., a fault was detected) in the one or more components of the memory device 310. Alternatively, if the one or more components of the memory device 310 do not satisfy the degradation level, the memory device 310 may set a first bit of the mode register low (e.g., OP[0]=0). Accordingly, the bit may indicate that no fault has occurred (e.g., no fault was detected) in the one or more components of the memory device 310. In some cases, the memory device 310 may falsely identify a fault, or alternatively, fail to identify a fault based on a health level of the health monitoring logic. For example, the memory device 310 may set a first bit of the mode register high even when a fault has not occurred, or the memory device 310 may set a first bit of the mode register low even when a fault has occurred.

At 325, the memory device 310 may monitor the health level of the health monitoring logic of the memory device 310. For example, the memory device 310 may enable a self-check logic of the health monitoring logic to perform a self-check on the health monitoring logic. In some cases, the self-check logic may monitor a wear level of a component of the health monitoring logic, a temperature of a component of the health monitoring logic, an operating frequency of a component of the health monitoring logic, a threshold level of power drawn by the health monitoring logic, a threshold level of current drawn by the health monitoring logic, among other metrics. In some examples, the self-check logic may monitor an analog-to-digital converter of the health monitoring logic. Using, the self-check logic, the memory device 310 may generate a second value (e.g., 0 or 1).

At 330, the memory device 310 may write the second value to a mode register (MR123) of one or more mode registers (e.g., using a MRW command). For example, if the self-check logic of the health monitoring logic identifies a fault of the health monitoring logic, the memory device 310 may set a second bit of the mode register high (e.g., OP[6]=1). Accordingly, the second bit may indicate an unsuccessful operation of the health monitoring logic of the memory device 310. Alternatively, no faults are detected by the self-check circuit, the memory device 310 may set the second bit of the mode register low (e.g., OP[6]=0). Accordingly, the bit may indicate a successful operation health monitoring logic of the memory device 310.

In some cases, at 335, the memory device 310 may signal to the host device 305 that the host device 305 may read the mode register of the memory device 310. For example, the signal may indicate, to the host device 305, the mode register.

At 340, the host device 305 may transmit a read command (e.g., MRR) to the memory device 310. In some examples, the read command may be in response to the signaling from the memory device 310 at 335. In some cases, the memory device 310 may begin monitoring the health of the memory device 310, the health of the health monitoring logic, or both, based on receiving the read command from the host device 305.

At 345, the memory device 310 may retrieve information associated with the mode register based on receiving the read command from the host device 305 (e.g., using a MRR command, in some cases). For example, the memory device 310 may read the first value, the second value, or both. In some examples, the memory device 310 may read one or more additional values from the mode register (e.g., one or more values set to OP[1] through OP[5]).

At 350, the memory device 310 may transmit the retrieved information to the host device 305. In some examples, the retrieved information may be transmitted in response to the read command from the host device 305 at 340. In some cases, the information may indicate one or more health parameters of the memory device 310 to the host device 305. For example, the information may indicate a first health parameter (e.g., a health parameter of the memory device 310) associated with the first value, a second health parameter (e.g., a health parameter of the health monitoring logic) associated with the second value, or one or more additional health parameters.

At 355, the host device 305 may determine, based on the information provided by the memory device 310, whether the second value of the mode register is low (e.g., 0) or high (e.g., 1). Accordingly, if the second value of the mode register is high, the process flow may continue to 360. Alternatively, if the second value of the mode register is low, the process flow may continue directly to 365.

In some cases, at 360, if the host device 305 determines that the second value of the register is high, the host device 305 may ignore (e.g., discard) the first value of the mode register. For example, the second value may indicate that one or more faults occurred at the health monitoring circuitry of the memory device 310. Accordingly, due to the faulty health monitoring circuitry, the first value of the mode register may or may not be valid, and therefore cannot be validated. Based on this indication, the host device 305 may ignore the first value received from the memory device 310. In some examples, the second value may indicate that the first value of the mode register is not valid, and the host device 305 may assign a different (e.g., opposite) value to the first value. For example, if the first value of the mode register is low but the second value of the mode register is high, the host device 305 may perform an operation at 365 according to when the first value is high. Alternatively, if the first value of the mode register is high and the second value of the mode register is high, the host device 305 may perform an operation at 365 according to when the first value is low.

In some cases, at 365, if the host device 305 determines that the second value of the register is low, the host device 305 may determine that the first value of the mode register is valid. For example, the second value may indicate that no faults occurred at the health monitoring circuitry of the memory device 310. Based on this indication, the host device 305 may perform one or more operations based on validating (e.g., determining the validity) of the first value. For example, if the first value of the mode register is low and the second value of the mode register is low, the host device 305 may perform an operation according to when the first value is low, including adjusting one or more parameters associated with the memory device 310. Alternatively, if the first value of the mode register is high but the second value of the mode register is low, the host device 305 may perform an operation (e.g., refrain from performing further operations on the memory device 310 or a portion of the memory device 310, operate in a safe mode, etc.) according to when the first value is high.

Figure 4:
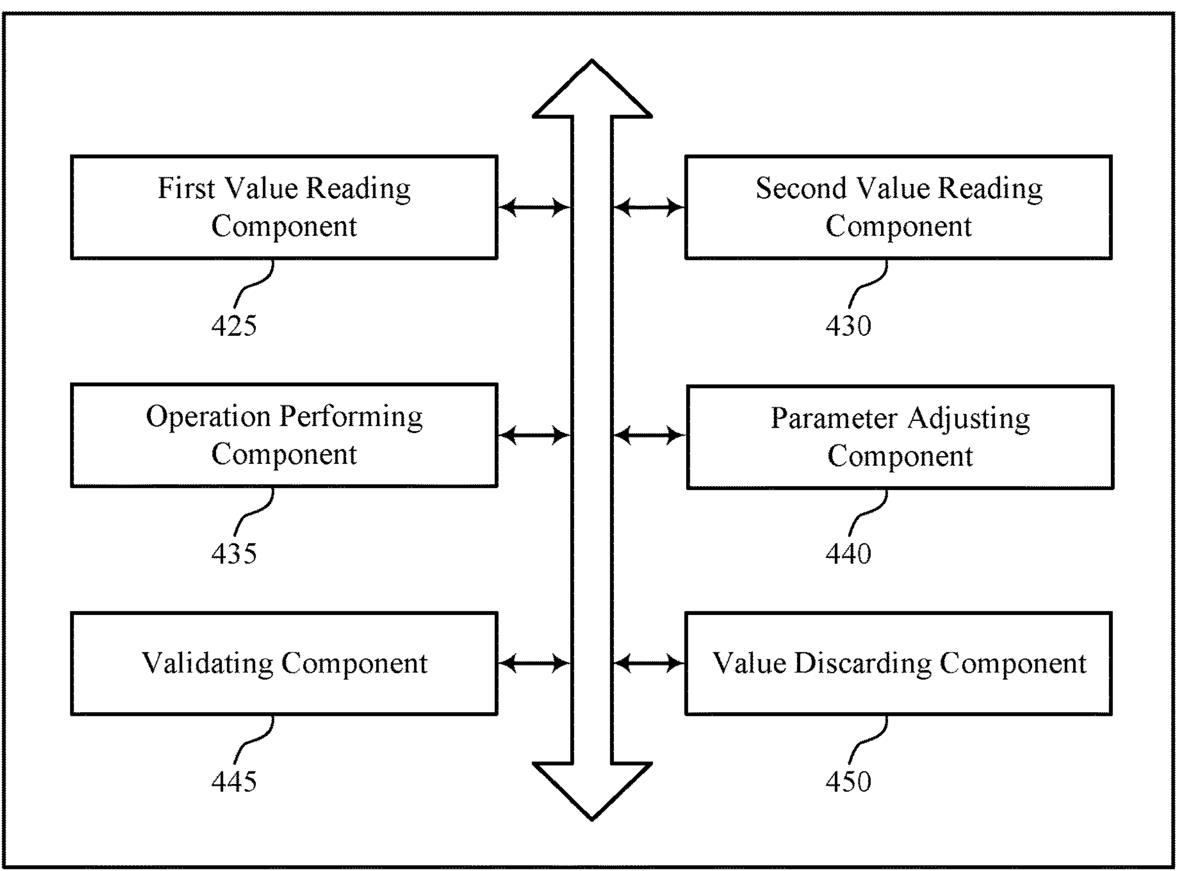
FIG. 4 shows a block diagram of a host device that supports memory device health monitoring logic in accordance with examples as disclosed herein.
Figure 4:
Figure 4:

FIG. 4 shows a block diagram 400 of a host device 420 that supports memory device health monitoring logic in accordance with examples as disclosed herein. The host device 420 may be an example of aspects of a host device as described with reference to FIGS. 1 through 3. The host device 420, or various components thereof, may be an example of means for performing various aspects of memory device health monitoring logic as described herein. For example, the host device 420 may include a first value reading component 425, a second value reading component 430, an operation performing component 435, a parameter adjusting component 440, a validating component 445, a value discarding component 450, or any combination thereof. Each of these components may communicate, directly or indirectly, with one another (e.g., via one or more buses).

The first value reading component 425 may be configured as or otherwise support a means for reading, from a register of a memory device, a first value indicating a health parameter of the memory device measured using health monitoring logic of the memory device. The second value reading component 430 may be configured as or otherwise support a means for reading, from the register, a second value indicating a state of the health monitoring logic of the memory device used to generate the first value. The operation performing component 435 may be configured as or otherwise support a means for performing an operation associated with the first value based at least in part on the second value.

In some examples, to support performing the operation, the parameter adjusting component 440 may be configured as or otherwise support a means for adjusting one or more parameters associated with the memory device based at least in part on determining that the second value a successful operation of the health monitoring logic.

In some examples, the validating component 445 may be configured as or otherwise support a means for determining whether the first value includes a valid value based at least in part on reading the second value, where the validity of the first value is based at least in part on the state of the health monitoring logic of the memory device.

In some examples, the second value indicates a first state of the health monitoring logic associated with a successful operation of the health monitoring logic.

In some examples, the second value indicates a second state of the health monitoring logic associated with an unsuccessful operation of the health monitoring logic, the unsuccessful operation including one or more faults of the health monitoring logic.

In some examples, the first value indicates one of a first health parameter or a second health parameter, the first health parameter associated with a successful operation of the memory device and the second health parameter associated with an unsuccessful operation of the memory device.

In some examples, the state of the health monitoring logic is associated with an analog-to-digital converter of the health monitoring logic.

In some examples, the state of the health monitoring logic is associated with a power threshold of the health monitoring logic, a current threshold of the health monitoring logic, or both.

In some examples, a first bit of the register includes the first value and a second bit of the register includes the second value.

In some examples, to support performing the operation, the value discarding component 450 may be configured as or otherwise support a means for discarding the first value based at least in part on determining that the second value indicates an unsuccessful operation of the health monitoring logic.

In some examples, the first value indicates one of a first health parameter or a second health parameter, the first health parameter associated with a successful operation of the memory device and the second health parameter associated with an unsuccessful operation of the memory device.

In some examples, the second value indicates a first state of the health monitoring logic associated with a successful operation of the health monitoring logic.

In some examples, the second value indicates a second state of the health monitoring logic associated with an unsuccessful operation of the health monitoring logic, the unsuccessful operation including one or more faults of the health monitoring logic.

In some examples, the first value indicates one of a first health parameter or a second health parameter, the first health parameter associated with a successful operation of the memory device and the second health parameter associated with an unsuccessful operation of the memory device.

In some examples, the state of the health monitoring logic is associated with an analog-to-digital converter of the health monitoring logic.

In some examples, the second value indicates a first state of the health monitoring logic associated with a successful operation of the health monitoring logic.

In some examples, the second value indicates a second state of the health monitoring logic associated with an unsuccessful operation of the health monitoring logic, the unsuccessful operation including one or more faults of the health monitoring logic.

In some examples, the state of the health monitoring logic is associated with an analog-to-digital converter of the health monitoring logic.

In some examples, the state of the health monitoring logic is associated with a power threshold of the health monitoring logic, a current threshold of the health monitoring logic, or both.

In some examples, storing the first value includes setting a first bit of the register to the first value and. In some examples, storing the second value includes setting a second bit of the register to the second value.

Figure 5:
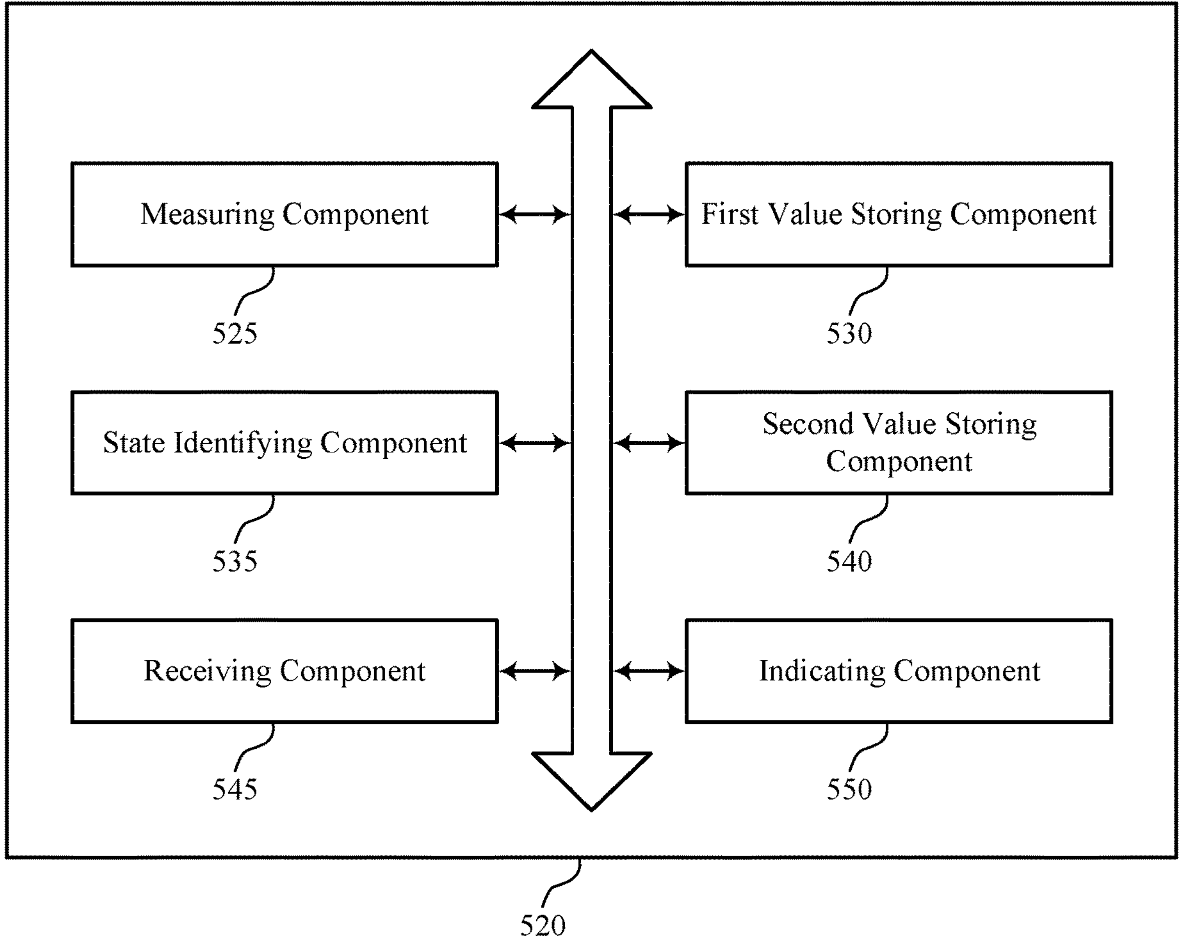
FIG. 5 shows a block diagram of a memory device that supports memory device health monitoring logic in accordance with examples as disclosed herein.

FIG. 5 shows a block diagram 500 of a memory device 520 that supports memory device health monitoring logic in accordance with examples as disclosed herein. The memory device 520 may be an example of aspects of a memory device as described with reference to FIGS. 1 through 3. The memory device 520, or various components thereof, may be an example of means for performing various aspects of memory device health monitoring logic as described herein. For example, the memory device 520 may include a measuring component 525, a first value storing component 530, a state identifying component 535, a second value storing component 540, a receiving component 545, an indicating component 550, or any combination thereof. Each of these components may communicate, directly or indirectly, with one another (e.g., via one or more buses).

The measuring component 525 may be configured as or otherwise support a means for measuring a health parameter of a memory device using health monitoring logic of the memory device. The first value storing component 530 may be configured as or otherwise support a means for storing a first value associated with the health parameter in a register of the memory device based at least in part on measuring the health parameter. The state identifying component 535 may be configured as or otherwise support a means for identifying a state of the health monitoring logic of the memory device used to generate the first value. The second value storing component 540 may be configured as or otherwise support a means for storing a second value indicating the state of the health monitoring logic in the register based at least in part on identifying the state of the health monitoring logic.

In some examples, the receiving component 545 may be configured as or otherwise support a means for receiving a command to retrieve a first set of data from the memory device, where measuring the health parameter of the memory device, identifying the state of the health monitoring logic of the memory device, or both is based at least in part on receiving the command.

In some examples, the indicating component 550 may be configured as or otherwise support a means for outputting an indication of the state of the health monitoring logic based at least in part on identifying the state of the health monitoring logic, where the indication includes the second value.

Figure 6:
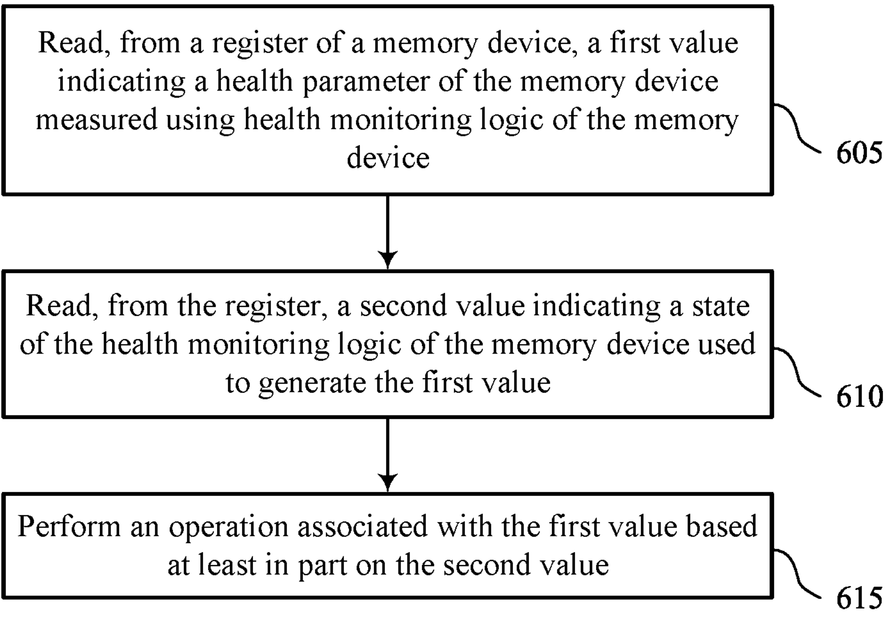
FIGS. 6 and 7 show flowcharts illustrating a method or methods that support memory device health monitoring logic in accordance with examples as disclosed herein.

FIG. 6 shows a flowchart illustrating a method 600 that supports memory device health monitoring logic in accordance with examples as disclosed herein. The operations of method 600 may be implemented by a host device or its components as described herein. For example, the operations of method 600 may be performed by a host device as described with reference to FIGS. 1 through 4. In some examples, a host device may execute a set of instructions to control the functional elements of the device to perform the described functions. Additionally, or alternatively, the wireless host device may perform aspects of the described functions using special-purpose hardware.

At 605, the method may include reading, from a register of a memory device, a first value indicating a health parameter of the memory device measured using health monitoring logic of the memory device. The operations of 605 may be performed in accordance with examples as disclosed herein. In some examples, aspects of the operations of 605 may be performed by a first value reading component 425 as described with reference to FIG. 4.

At 610, the method may include reading, from the register, a second value indicating a state of the health monitoring logic of the memory device used to generate the first value. The operations of 610 may be performed in accordance with examples as disclosed herein. In some examples, aspects of the operations of 610 may be performed by a second value reading component 430 as described with reference to FIG. 4.

At 615, the method may include performing an operation associated with the first value based at least in part on the second value. The operations of 615 may be performed in accordance with examples as disclosed herein. In some examples, aspects of the operations of 615 may be performed by an operation performing component 435 as described with reference to FIG. 4.

In some examples, an apparatus as described herein may perform a method or methods, such as the method 600. The apparatus may include features, circuitry, logic, means, or instructions (e.g., a non-transitory computer-readable medium storing instructions executable by one or more processors), or any combination thereof for performing the following aspects of the present disclosure:

Aspect 1: A method, apparatus, or non-transitory computer-readable medium including operations, features, circuitry, logic, means, or instructions, or any combination thereof for reading, from a register of a memory device, a first value indicating a health parameter of the memory device measured using health monitoring logic of the memory device; reading, from the register, a second value indicating a state of the health monitoring logic of the memory device used to generate the first value; and performing an operation associated with the first value based at least in part on the second value.

Aspect 2: The method, apparatus, or non-transitory computer-readable medium of aspect 1, further including operations, features, circuitry, logic, means, or instructions, or any combination thereof for determining whether the first value includes a valid value based at least in part on reading the second value, where the validity of the first value is based at least in part on the state of the health monitoring logic of the memory device.

Aspect 3: The method, apparatus, or non-transitory computer-readable medium of any of aspects 1 through 2, where the second value indicates a first state of the health monitoring logic associated with a successful operation of the health monitoring logic.

Aspect 4: The method, apparatus, or non-transitory computer-readable medium of any of aspects 1 through 3, where the second value indicates a second state of the health monitoring logic associated with an unsuccessful operation of the health monitoring logic, the unsuccessful operation including one or more faults of the health monitoring logic.

Aspect 5: The method, apparatus, or non-transitory computer-readable medium of any of aspects 1 through 4, where the first value indicates one of a first health parameter or a second health parameter, the first health parameter associated with a successful operation of the memory device and the second health parameter associated with an unsuccessful operation of the memory device.

Aspect 6: The method, apparatus, or non-transitory computer-readable medium of any of aspects 1 through 5, where the state of the health monitoring logic is associated with an analog-to-digital converter of the health monitoring logic.

Aspect 7: The method, apparatus, or non-transitory computer-readable medium of any of aspects 1 through 6, where the state of the health monitoring logic is associated with a power threshold of the health monitoring logic, a current threshold of the health monitoring logic, or both.

Aspect 8: The method, apparatus, or non-transitory computer-readable medium of any of aspects 1 through 7, where a first bit of the register includes the first value and a second bit of the register includes the second value.

Aspect 9: The method, apparatus, or non-transitory computer-readable medium of any of aspects 1 through 8, where performing the operation further includes operations, features, circuitry, logic, means, or instructions, or any combination thereof for discarding the first value based at least in part on determining that the second value indicates an unsuccessful operation of the health monitoring logic.

Aspect 10: The method, apparatus, or non-transitory computer-readable medium of any of aspects 1 through 9, where performing the operation further includes operations, features, circuitry, logic, means, or instructions, or any combination thereof for adjusting one or more parameters associated with the memory device based at least in part on determining that the second value a successful operation of the health monitoring logic.

Aspect 11: The method, apparatus, or non-transitory computer-readable medium of any of aspects 1 through 10, where the first value indicates one of a first health parameter or a second health parameter, the first health parameter associated with a successful operation of the memory device and the second health parameter associated with an unsuccessful operation of the memory device.

Figure 7:
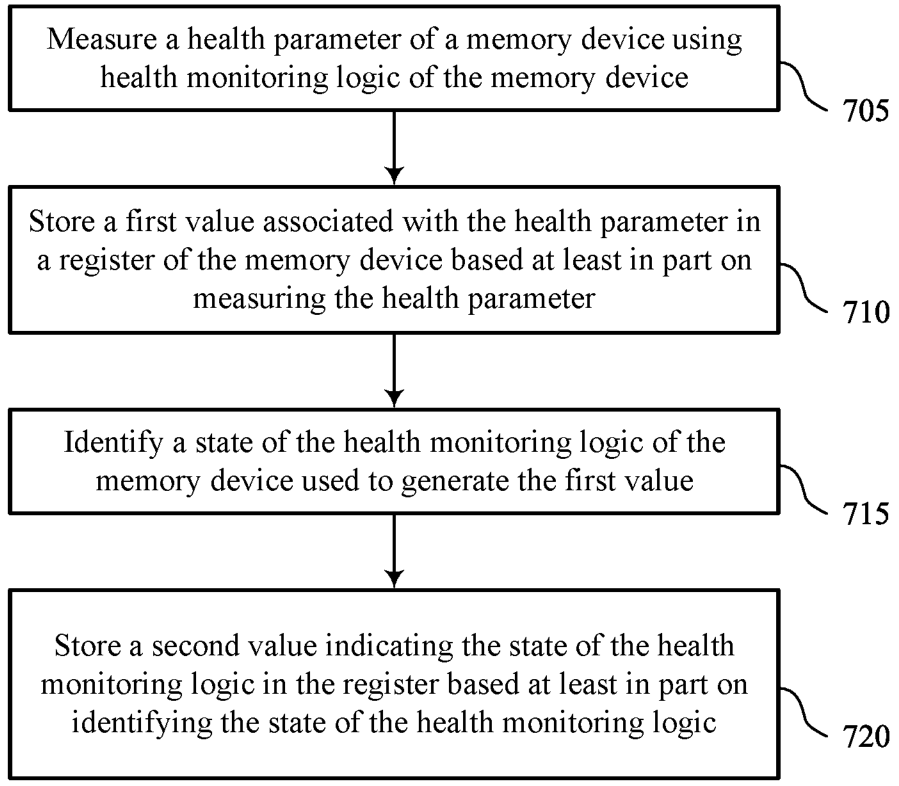

FIG. 7 shows a flowchart illustrating a method 700 that supports memory device health monitoring logic in accordance with examples as disclosed herein. The operations of method 700 may be implemented by a memory device or its components as described herein. For example, the operations of method 700 may be performed by a memory device as described with reference to FIGS. 1 through 3 and 5. In some examples, a memory device may execute a set of instructions to control the functional elements of the device to perform the described functions. Additionally, or alternatively, the wireless memory device may perform aspects of the described functions using special-purpose hardware.

At 705, the method may include measuring a health parameter of a memory device using health monitoring logic of the memory device. The operations of 705 may be performed in accordance with examples as disclosed herein. In some examples, aspects of the operations of 705 may be performed by a measuring component 525 as described with reference to FIG. 5.

At 710, the method may include storing a first value associated with the health parameter in a register of the memory device based at least in part on measuring the health parameter. The operations of 710 may be performed in accordance with examples as disclosed herein. In some examples, aspects of the operations of 710 may be performed by a first value storing component 530 as described with reference to FIG. 5.

At 715, the method may include identifying a state of the health monitoring logic of the memory device used to generate the first value. The operations of 715 may be performed in accordance with examples as disclosed herein. In some examples, aspects of the operations of 715 may be performed by a state identifying component 535 as described with reference to FIG. 5.

At 720, the method may include storing a second value indicating the state of the health monitoring logic in the register based at least in part on identifying the state of the health monitoring logic. The operations of 720 may be performed in accordance with examples as disclosed herein. In some examples, aspects of the operations of 720 may be performed by a second value storing component 540 as described with reference to FIG. 5.

In some examples, an apparatus as described herein may perform a method or methods, such as the method 700. The apparatus may include features, circuitry, logic, means, or instructions (e.g., a non-transitory computer-readable medium storing instructions executable by one or more processors), or any combination thereof for performing the following aspects of the present disclosure:

Aspect 12: A method, apparatus, or non-transitory computer-readable medium including operations, features, circuitry, logic, means, or instructions, or any combination thereof for measuring a health parameter of a memory device using health monitoring logic of the memory device; storing a first value associated with the health parameter in a register of the memory device based at least in part on measuring the health parameter; identifying a state of the health monitoring logic of the memory device used to generate the first value; and storing a second value indicating the state of the health monitoring logic in the register based at least in part on identifying the state of the health monitoring logic.

Aspect 13: The method, apparatus, or non-transitory computer-readable medium of aspect 12, further including operations, features, circuitry, logic, means, or instructions, or any combination thereof for receiving a command to retrieve a first set of data from the memory device, where measuring the health parameter of the memory device, identifying the state of the health monitoring logic of the memory device, or both is based at least in part on receiving the command.

Aspect 14: The method, apparatus, or non-transitory computer-readable medium of any of aspects 12 through 13, further including operations, features, circuitry, logic, means, or instructions, or any combination thereof for outputting an indication of the state of the health monitoring logic based at least in part on identifying the state of the health monitoring logic, where the indication includes the second value.

It should be noted that the methods described herein describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (e.g., in conductive contact with, connected with, coupled with) one another if there is any electrical path (e.g., conductive path) between the components that can, at any time, support the flow of signals (e.g., charge, current, voltage) between the components. At any given time, a conductive path between components that are in electronic communication with each other (e.g., in conductive contact with, connected with, coupled with) may be an open circuit or a closed circuit based on the operation of the device that includes the connected components. A conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorus, boron, or arsenic. Doping may be performed during the initial formation or growth of the substrate, by ion-implantation, or by any other doping means.

A switching component (e.g., a transistor) discussed herein may represent a field-effect transistor (FET), and may comprise a three-terminal component including a source (e.g., a source terminal), a drain (e.g., a drain terminal), and a gate (e.g., a gate terminal). The terminals may be connected to other electronic components through conductive materials (e.g., metals, alloys). The source and drain may be conductive, and may comprise a doped (e.g., heavily doped, degenerate) semiconductor region. The source and drain may be separated by a doped (e.g., lightly doped) semiconductor region or channel. If the channel is n-type (e.g., majority carriers are electrons), then the FET may be referred to as a n-type FET. If the channel is p-type (e.g., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by one or more processors, firmware, or any combination thereof. If implemented in software executed by one or more processors, the functions may be stored on or transmitted over as one or more instructions (e.g., code) on a computer-readable medium. Other examples and implementations are within the scope of the disclosure and appended claims. For example, due to the nature of software, functions described herein can be implemented using software executed by one or more processors, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with one or more processors, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or any type of processor. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a computer, or one or more processors. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:

reading, from a register of a memory device, a first value indicating a health parameter of the memory device measured using health monitoring logic of the memory device, wherein the first value is used to perform a responsive operation;

reading, from the register, a second value indicating a state of the health monitoring logic of the memory device used to generate the first value, the second value determined using a self-check logic, wherein the second value is used to flag a fault associated with the first value; and performing the responsive operation associated with the first value based at least in part on the second value, wherein the responsive operation comprises at least one of replacing the memory device, operating the memory device in a safe mode, or continuing to monitor the memory device.

2. The method of claim 1, further comprising:

determining whether the first value comprises a valid value based at least in part on reading the second value, wherein the validity of the first value is based at least in part on the state of the health monitoring logic of the memory device.

3. The method of claim 1, wherein the second value indicates a first state of the health monitoring logic associated with a successful operation of the health monitoring logic.

4. The method of claim 1, wherein the second value indicates a second state of the health monitoring logic associated with an unsuccessful operation of the health monitoring logic, the unsuccessful operation comprising one or more faults of the health monitoring logic.

5. The method of claim 1, wherein the first value indicates one of a first health parameter or a second health parameter, the first health parameter associated with a successful operation of the memory device and the second health parameter associated with an unsuccessful operation of the memory device.

6. The method of claim 1, wherein the state of the health monitoring logic is associated with an analog-to-digital converter of the health monitoring logic.

7. The method of claim 1, wherein the state of the health monitoring logic is associated with a power threshold of the health monitoring logic, a current threshold of the health monitoring logic, or both.

8. The method of claim 1, wherein a first bit of the register comprises the first value and a second bit of the register comprises the second value.

9. The method of claim 1, wherein the responsive operation further comprises:

discarding the first value based at least in part on determining that the second value indicates an unsuccessful operation of the health monitoring logic, or performing additional checks to the memory device based at least in part on determining that the second value indicates the unsuccessful operation of the health monitoring logic.

10. The method of claim 1, wherein the responsive operation further comprises:

adjusting one or more parameters associated with the memory device based at least in part on determining that the second value indicates a successful operation of the health monitoring logic, or writing an index value to the register to configure a specific degradation level threshold based at least in part on determining that the second value indicates the successful operation of the health monitoring logic.

11. A method, comprising:

measuring a health parameter of a memory device using health monitoring logic of the memory device;

storing a first value associated with the health parameter in a register of the memory device based at least in part on measuring the health parameter, wherein the first value is used to perform a responsive operation;

identifying, using a self-check logic, a state of the health monitoring logic of the memory device used to generate the first value; and storing a second value indicating the state of the health monitoring logic in the register based at least in part on identifying the state of the health monitoring logic, wherein the second value is used to flag a fault associated with the first value, wherein the responsive operation comprises at least one of replacing the memory device, operating the memory device in a safe mode, or continuing to monitor the memory device.

12. The method of claim 11, further comprising:

receiving a command to retrieve a first set of data from the memory device, wherein measuring the health parameter of the memory device, identifying the state of the health monitoring logic of the memory device, or both is based at least in part on receiving the command.

13. The method of claim 11, further comprising:

outputting an indication of the state of the health monitoring logic based at least in part on identifying the state of the health monitoring logic, wherein the indication comprises the second value.

14. An apparatus, comprising:

logic operable to couple with a memory device, the logic configured to cause the apparatus to:

read, from a register of the memory device, a first value indicating a health parameter of the memory device measured using health monitoring logic of the memory device, wherein the first value is used to perform a responsive operation;

read, from the register, a second value indicating a state of the health monitoring logic used to generate the first value, the second value determined using a self-check logic, wherein the second value is used to flag a fault associated with the first value; and perform the responsive operation associated with the first value based at least in part on the second value, wherein the responsive operation comprises at least one of replacing the memory device, operating the memory device in a safe mode, or continuing to monitor the memory device.

15. The apparatus of claim 14, further comprising:

determining whether the first value comprises a valid value based at least in part on reading the second value, wherein the validity of the first value is based at least in part on the state of the health monitoring logic of the memory device.

16. The apparatus of claim 14, wherein the second value indicates a first state of the health monitoring logic associated with a successful operation of the health monitoring logic.

17. The apparatus of claim 14, wherein the second value indicates a second state of the health monitoring logic associated with an unsuccessful operation of the health monitoring logic, the unsuccessful operation comprising one or more faults of the health monitoring logic.

18. The apparatus of claim 14, wherein the first value indicates one of a first health parameter or a second health parameter, the first health parameter associated with a successful operation of the memory device and the second health parameter associated with an unsuccessful operation of the memory device.

19. The apparatus of claim 14, wherein a first bit of the register indicates the first value and wherein a second bit of the register indicates the second value.

* * * * *